US012757287B2

(12) United States Patent
Yang et al.

(10) Patent No.: US 12,757,287 B2
(45) Date of Patent: Oct. 6, 2026

(54) USER EQUIPMENT INITIATED CONNECTED DISCONTINUOUS RECEPTION COMMAND

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/630,914

(22) Filed: Apr. 9, 2024

(65) Prior Publication Data

US 2025/0089123 A1 Mar. 13, 2025

Related U.S. Application Data

(60) Provisional application No. 63/581,052, filed on Sep. 7, 2023.

(51) Int. Cl.
*H04W 76/28* (2018.01)
*H04W 52/02* (2009.01)

(52) U.S. Cl.
CPC ....... *H04W 76/28* (2018.02); *H04W 52/0235* (2013.01)

(58) Field of Classification Search
CPC ............. H04W 76/28; H04W 52/0235; H04W 52/0216; Y02D 30/70
See application file for complete search history.

(56) References Cited

U.S. PATENT DOCUMENTS

| | | | | |
|---|---|---|---|---|
| 10,499,451 B2 * | 12/2019 | Tabet | H04W 76/28 | |
| 2014/0036748 A1 * | 2/2014 | Mukherjee | H04W 52/0212 | 370/311 |
| 2015/0016323 A1 * | 1/2015 | Sundararajan | H04W 52/0209 | 370/311 |
| 2015/0305056 A1 * | 10/2015 | Vangala | H04W 76/27 | 455/450 |

* cited by examiner

*Primary Examiner* — Marisol Figueroa
(74) *Attorney, Agent, or Firm* — Patterson & Sheridan LLP

(57) ABSTRACT

Certain aspects of the present disclosure provide techniques for user equipment (UE) initiated enhanced connected discontinuous reception (C-DRX) commands. An example method, performed at a user equipment (UE), generally includes receiving first signaling configuring the UE for an enhanced connected discontinuous reception (C-DRX) mode, and transmitting a request for the UE to enter a low power state during a current C-DRX cycle prior to expiration of at least one of an on duration timer or inactivity timer, wherein the request proposes the UE remain in the low power state for a first number of one or more future C-DRX cycles.

21 Claims, 11 Drawing Sheets

USER EQUIPMENT INITIATED CONNECTED DISCONTINUOUS RECEPTION COMMAND

CROSS-REFERENCE TO RELATED APPLICATION

This application claims benefit of and priority to U.S. Provisional Application No. 63/581,052, filed Sep. 7, 2023, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for power saving based on user equipment (UE) initiated connected discontinuous reception (C-DRX) commands.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes receiving first signaling configuring the UE for an enhanced connected discontinuous reception (C-DRX) mode; and transmitting a request for the UE to enter a low power state during a current C-DRX cycle prior to expiration of at least one of an on duration timer or inactivity timer, wherein the request proposes the UE remain in the low power state for a first number of one or more future C-DRX cycles.

Another aspect provides a method for wireless communications at a network entity. The method includes transmitting first signaling configuring a user equipment (UE) for an enhanced connected discontinuous reception (C-DRX) mode; and receiving a request for the UE to enter a low power state during a current C-DRX cycle prior to expiration of at least one of an on duration timer or inactivity timer, wherein the request proposes the UE remain in the low power state for a first number of one or more future C-DRX cycles.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for reducing power via user equipment (UE) initiated connected discontinuous reception (C-DRX) commands.

Various wireless devices, such as Internet of Things (IoT) and wearable devices have limited power sources. For example, smart glasses used for extended reality (XR) applications typically have small batteries (e.g., ~200 mAhr) owing to their small form factor. As used herein, the term XR generally encompasses various technologies, such as augmented reality (AR) and virtual reality (VR). Because adding a bigger battery in XR wearables is often impractical, power saving is typically considered as an important area for XR designs.

One mechanism for conserving power is to place a device, such as a user equipment (UE) participating in XR communications, in a connected discontinuous reception (CDRX) mode. In CDRX mode, a UE may stay in a low power state during a period of time referred to as a CDRX Sleep time (e.g., or Off-Duration). The UE may remain in the low power state until a CDRX Active time (e.g., or On-Duration), when the UE monitors for downlink data, sends uplink data, or takes channel measurements.

In some cases, certain conditions may lead a UE to determine that it does not need to remain in an On-duration (e.g., if it is not expecting downlink data, does not have uplink data to transmit, and/or does not have measurements to take). In such cases, the UE may benefit from entering a low power state early, for example, before expiration of an On-Duration timer or an inactivity timer that would normally indicate the start of the Off-duration.

Certain aspects of the present disclosure allow a UE to request to enter a low power state early (e.g., before expiration of an On-Duration timer or an inactivity timer). The request may also indicate a number of future C-DRX cycles for which the UE would like to remain in the low power state. As a result, the techniques proposed herein may result in reduced UE power consumption, via faster onset of the UE low power mode, as well as increased network power/energy savings.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
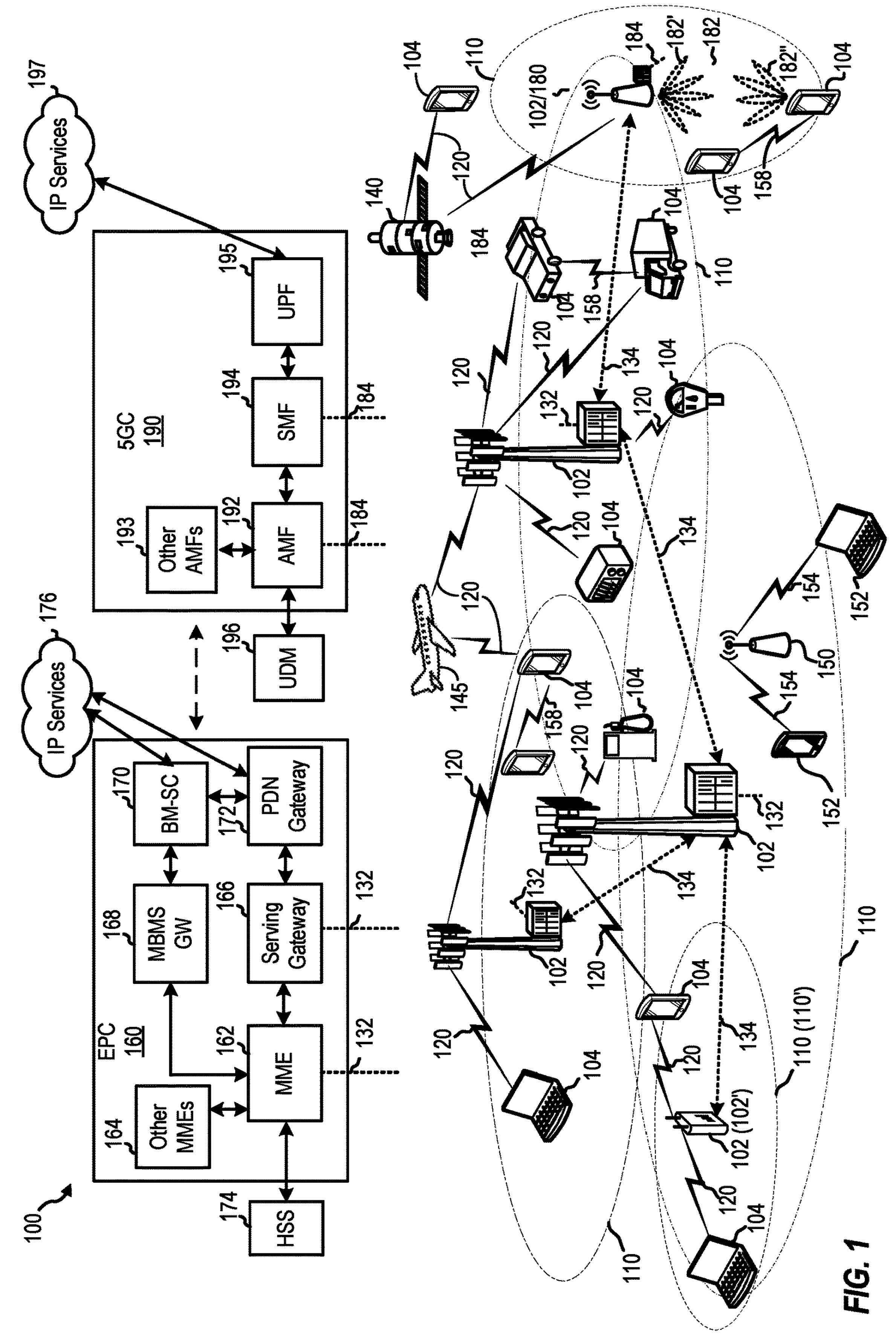
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
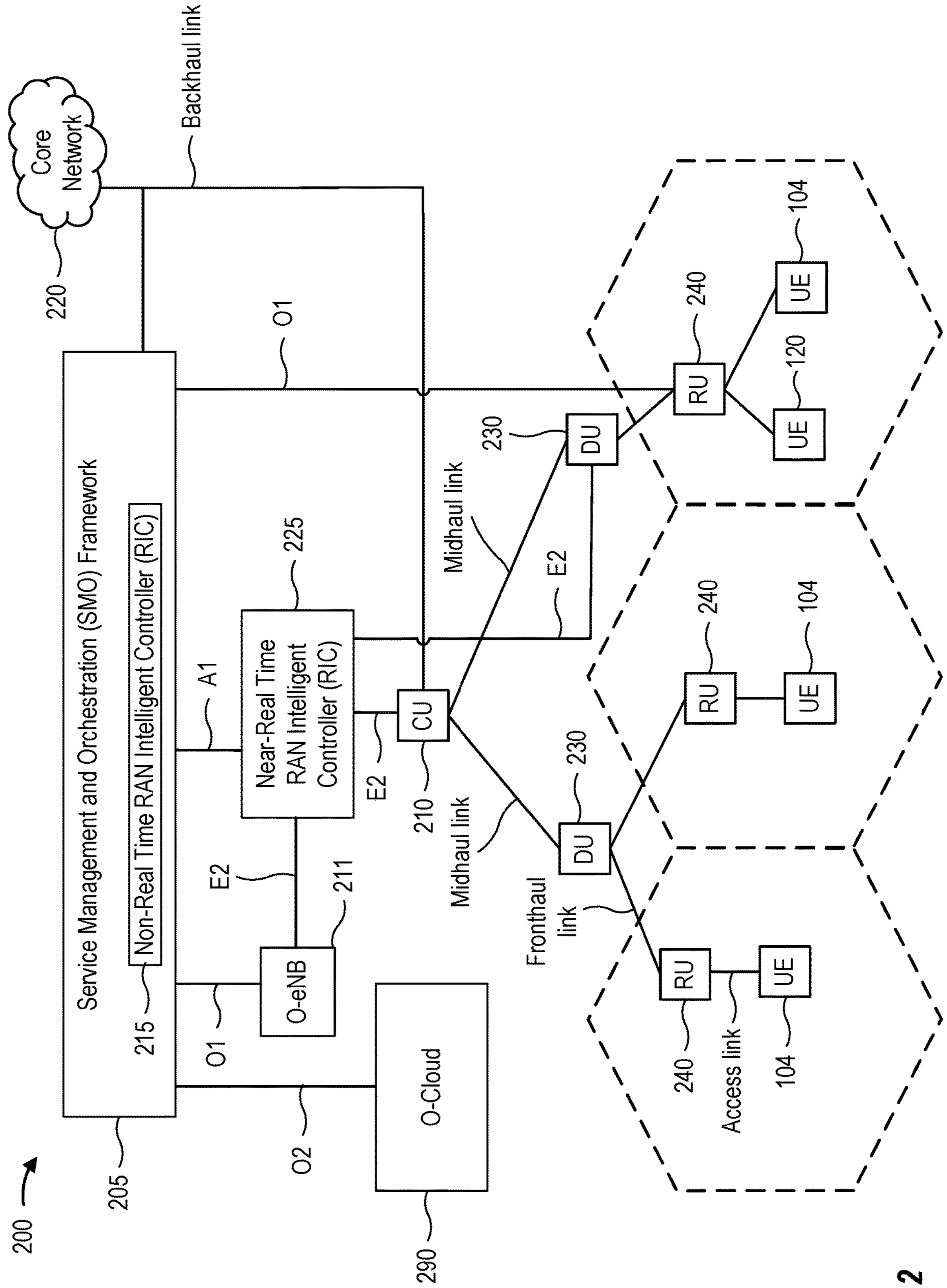
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
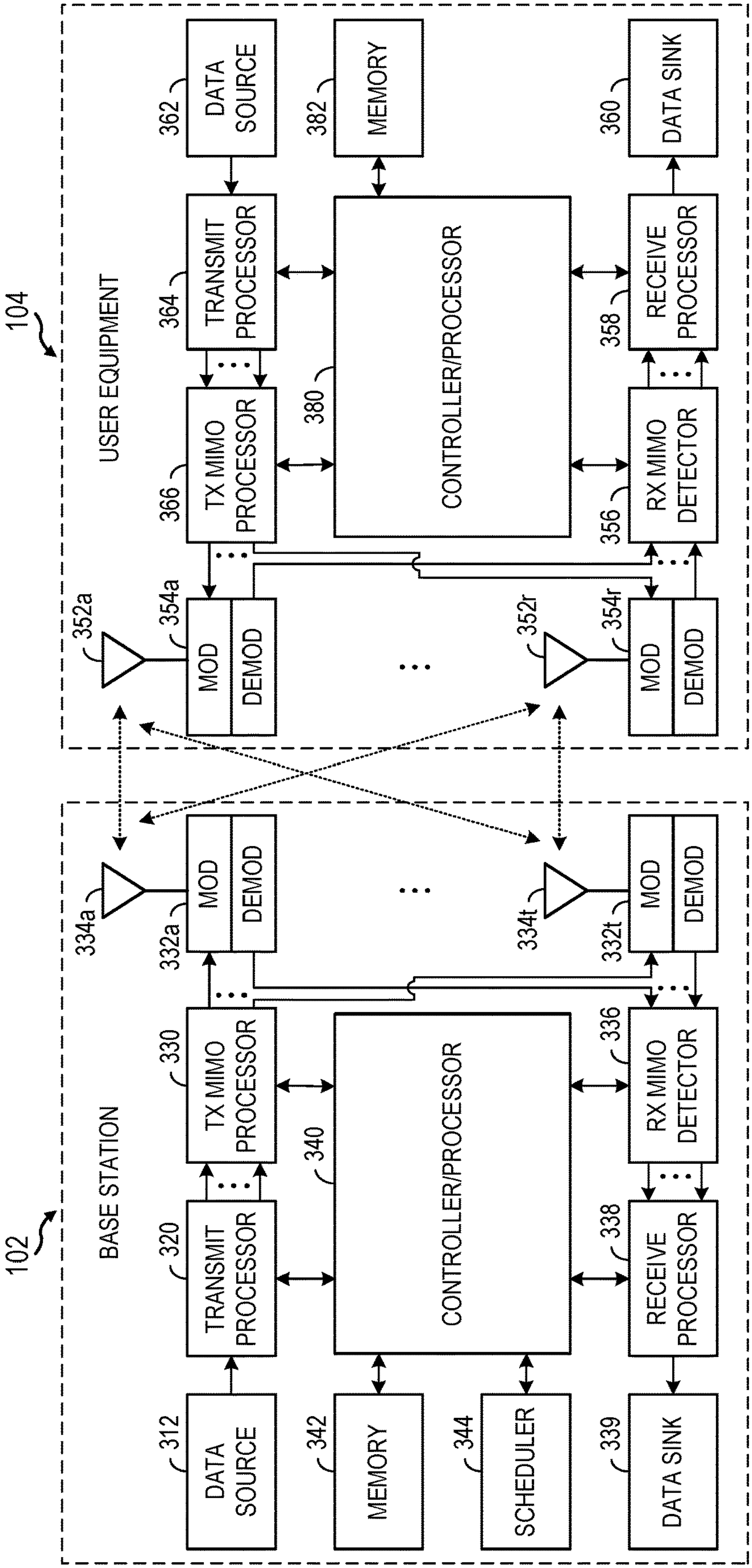
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, “transmitting” may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, “receiving” may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, “transmitting” may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, “receiving” may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
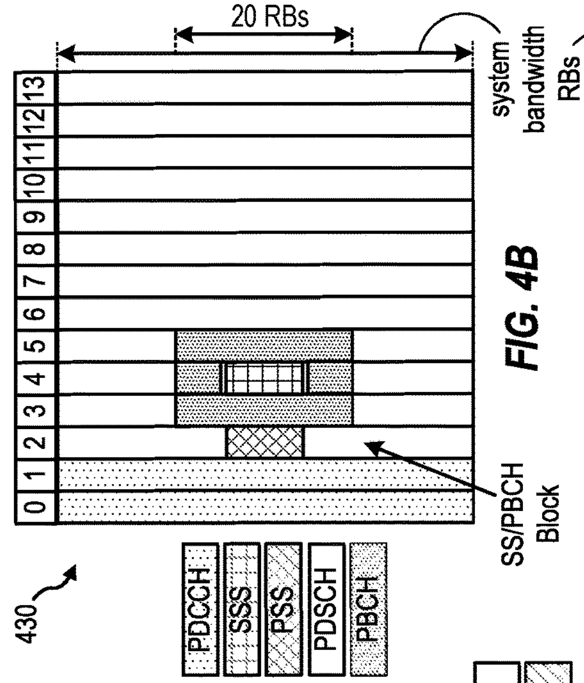
FIGS. 4A, 4B, 4C, and 4D depict various example aspects of data structures for a wireless communications network.
Figure 4A:
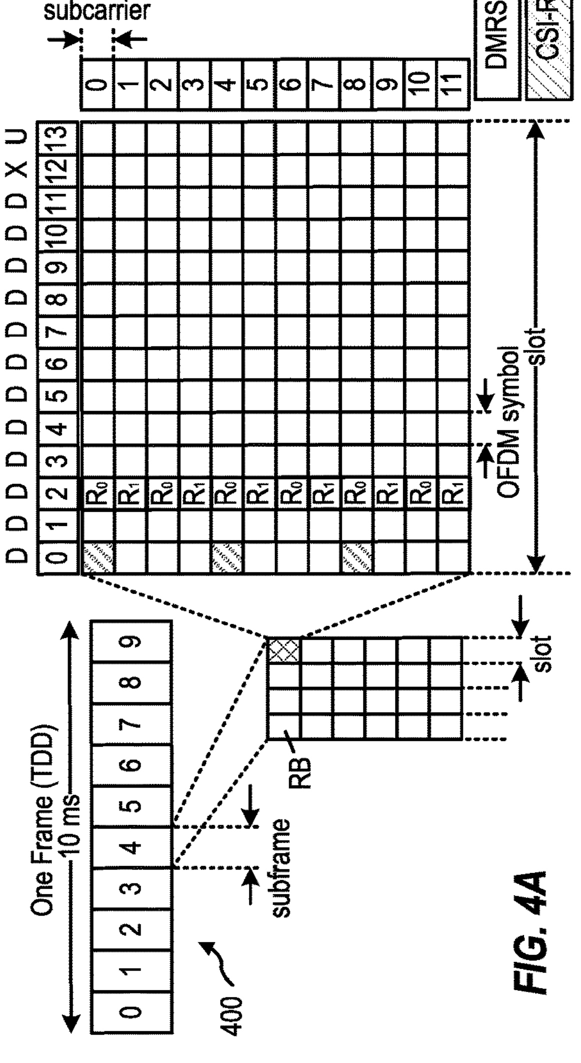
Figure 4D:
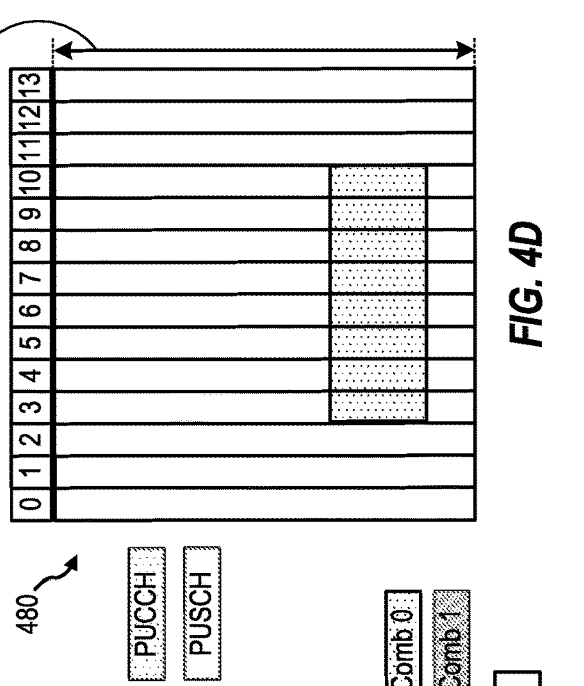
Figure 4C:
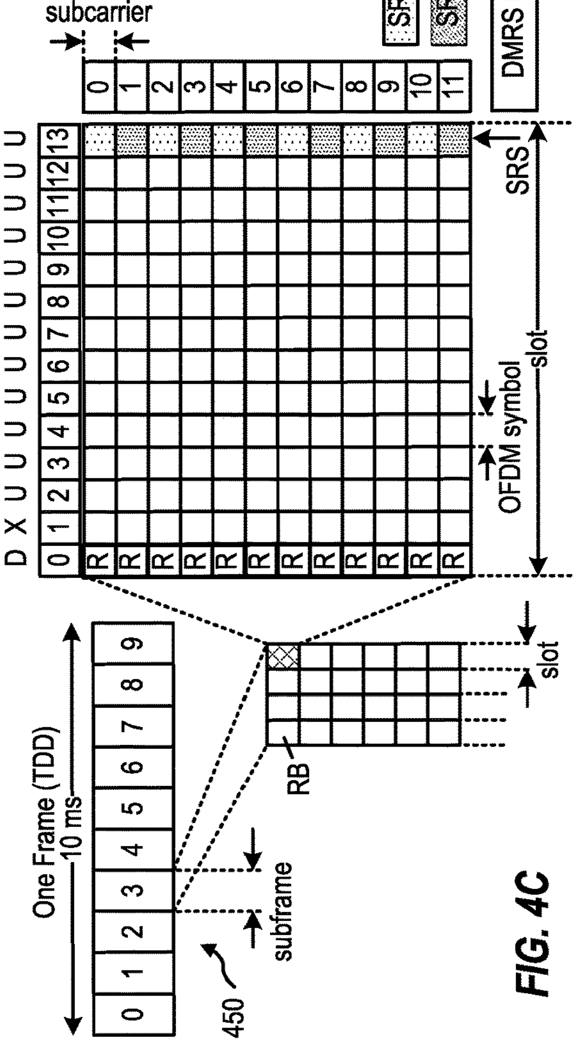

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 24×15 kHz, where u is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Discontinuous Reception

To reduce power consumption, a user equipment (UE) may be configured for discontinuous reception (DRX) operations. As illustrated in the timing diagram 500 of FIG. 5A, during a connected DRX mode (CDRX), UE duration can be broadly divided into "Active time" durations 502 and "non-Active" time durations 504.

During a CDRX Active time (or On-Duration), the UE monitors for physical downlink shared channel (PDSCH) activity continuously or with a given periodicity, receives downlink data, transmits UL data, and/or makes serving cell measurements or neighbor measurements. During Active time, a UE is generally considered "on" while various timers are running. For example, an Active duration timer (e.g., drx-onDurationTimer), an inactivity timer (drx-InactivityTimer), and a complete DRX cycle duration (e.g., drx-ShortCycle) may run during an Active time. The beginning of a DRX cycle may be defined by a starting offset value.

Figure 5A:
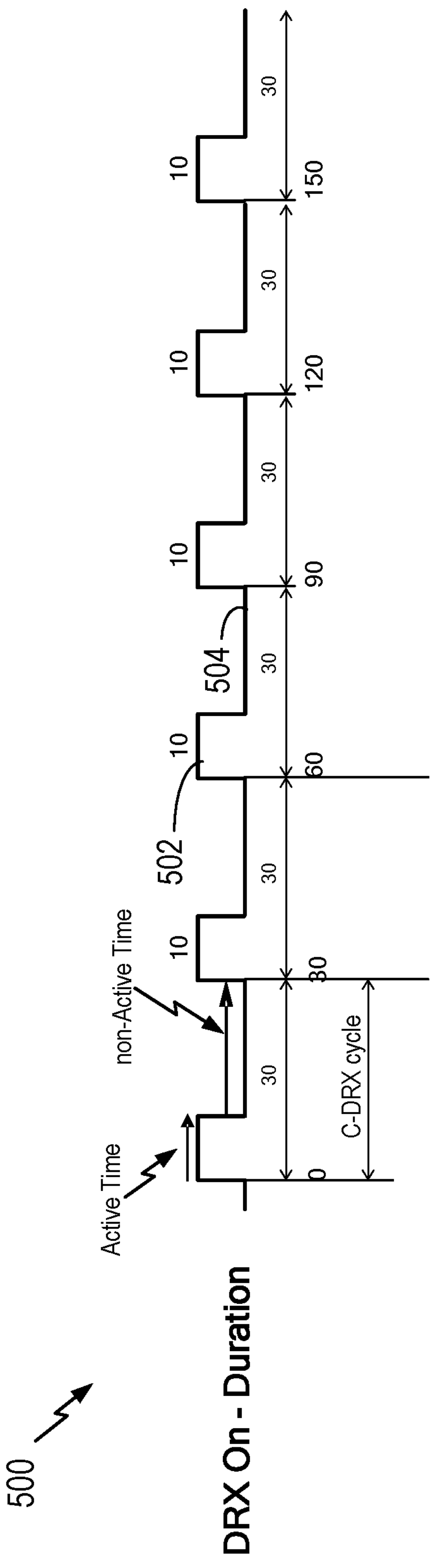
FIG. 5A and FIG. 5B depict example connected-mode discontinuous reception (C-DRX) timelines.
Figure 5B:
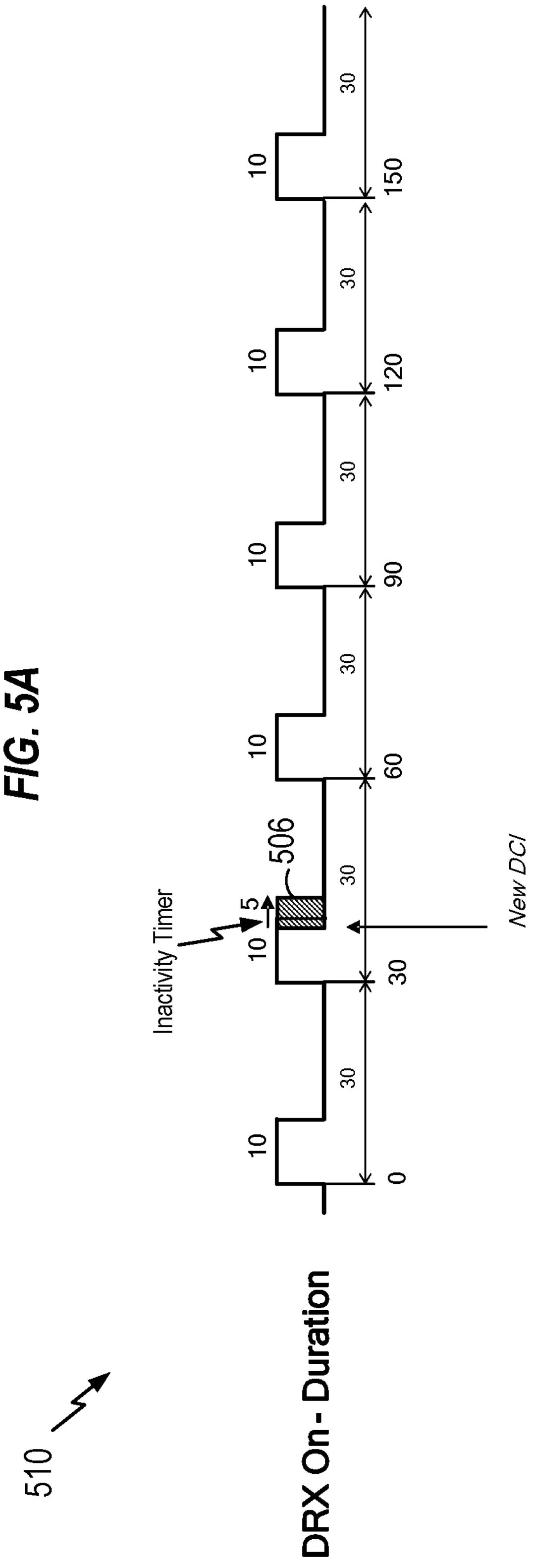

In the examples shown in FIGS. 5A and 5B, the active time is 10 ms and the CDRX cycle duration is 30 ms. As illustrated the timing diagram 510 of FIG. 5B, the UE may be configured with an inactivity timer (starting an inactivity period 506) that restarts when activity is detected and expires after 5 ms without detected activity. When the inactivity timer expires, the UE enters an "inactive" or "sleep" mode.

In some cases, a UE may be configured with an enhanced CDRX (eCDRX) mode to mitigate drift in latency resulting from misalignment with traffic burst arrivals. Current CDRX mode is configured for integer value periodicity, while typical multimedia data traffic update rates (e.g., 60 Hz, 90 Hz, 45 Hz, 120 Hz, or 48 Hz) often lead to non-integer value periodicity.

Aspects Related to UE Initiated C-DRX Commands

Aspects of the present disclosure provide apparatuses, methods, processing systems, and computer-readable mediums for reducing power via user equipment (UE) initiated connected discontinuous reception (C-DRX) commands.

As noted above, certain conditions may lead a UE to determine that it does not need to remain in an On-duration. For example, a UE may determine it can enter a low power state early (e.g., if it is not expecting downlink data, does not have uplink data to transmit, and/or does not have measurements to take). In such cases, the UE may benefit from entering a low power state early.

Figure 6:
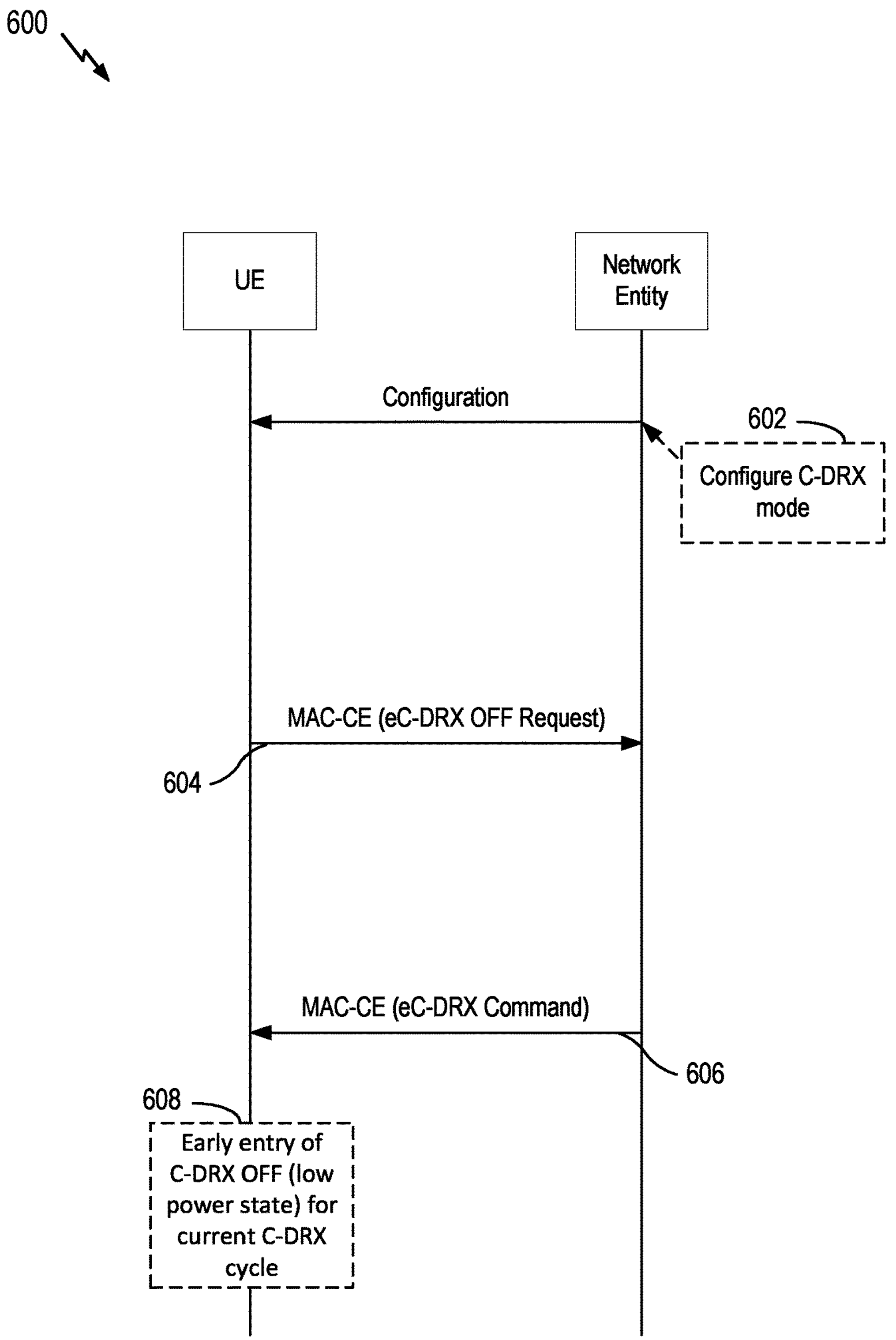
FIG. 6 depicts an example call flow diagram illustrating an example UE initiated C-DRX command.

FIG. 6 depicts an example call flow diagram illustrating example C-DRX commands for early entry to a low power state. In some aspects, the UE shown in FIG. 6 (e.g., and/or FIG. 7) may be an example of the UE 104 depicted and described with respect to FIGS. 1 and 3. In some aspects, the network entity shown in FIG. 6 (e.g., and/or FIG. 7) may be an example of the BS 102 (e.g., a gNB) depicted and described with respect to FIGS. 1 and 3 or a disaggregated base station depicted and described with respect to FIG. 2.

As illustrated at 602, the network entity may configure the UE to enter a C-DRX mode. The UE may determine that it does not need to remain active for a remaining portion of an On-duration. Therefore, the UE may send a request to enter a low power state early.

As illustrated at 604, the UE may send a request to enter C-DRX OFF early via an enhanced C-DRX request in a MAC CE. For example, referring again to FIGS. 5A and 5B, during a C-DRX On duration of a current C-DRX cycle, a UE may send an enhanced C-DRX command that indicates a request for the UE to enter the C-DRX Off duration (e.g., low power state) early, before expiration of the active time and/or inactivity timer.

In this manner, a C-DRX request (e.g., conveyed in a MAC CE) may allow a UE to inform the network of a potential reduction in the on-duration/active time. As illustrated at 606, the network entity may respond with a C-DRX command that indicates whether the request is granted (e.g., and the UE is allowed to enter C-DRX mode early as requested). In some cases, the network may respond with a (e.g., Long) DRX Command MAC-CE. The C-DRX request may use a same format for uplink as a downlink (e.g., Long) DRX command MAC-CE.

There are various benefits of using a UE initiated C-DRX command (e.g., to convey a request for early C-DRX OFF entry). For various applications, a UE may achieve significant power savings with negligible impact on packet latency. In some cases, how and when a UE triggers early transition to a low power state may depend on application characteristics. For example, for applications that are more delay tolerant, a UE may trigger early transition to CDRX sleep more aggressively and achieve higher UE power saving.

In some cases, the use of early C-DRX requests and commands may depend on UE capability. In some cases, the use of such C-DRX requests and commands and/or signaling of UE capability to support the same may be conveyed via implementation-specific or proprietary signaling (e.g., proprietary to private networks), rather than signaling defined in wireless standards.

Aspects Related to Enhanced C-DRX Commands

Aspects of the present disclosure may also provide various enhancements to C-DRX commands that may address certain limitations. For example, as illustrated at 608 in FIG. 6, certain C-DRX commands may only be applied to a current C-DRX cycle, which may not take full advantage of additional information available at the UE and/or network, such as traffic prediction based on an artificial intelligence and/or machine learning (AI/ML) model. Taking advantage of such information, an enhanced C-DRX (eC-DRX) command may result in additional UE power savings. An eC-DRX command may be considered enhanced relative to a C-DRX command that only applies to a current C-DRX cycle.

For example, in addition to indicating a request to enter a low power state of a current C-DRX cycle early, an enhanced C-DRX command may indicate a number of future C-DRX cycles that the UE would prefer to remain in the low power state-further enhancing potential power savings.

In some cases, the network may respond with a number of future C-DRX cycles for which the UE is allowed to stay in a low power state. The preferred and allowed numbers may or may not be the same. In this manner, the UE and network may effectively coordinate or negotiate power savings, based on various considerations. As will be described in greater detail below, these considerations may involve current or AI/ML model predicted amounts of traffic, quality of service (QOS) requirements, network loading, or UE power consumption.

Figure 7:
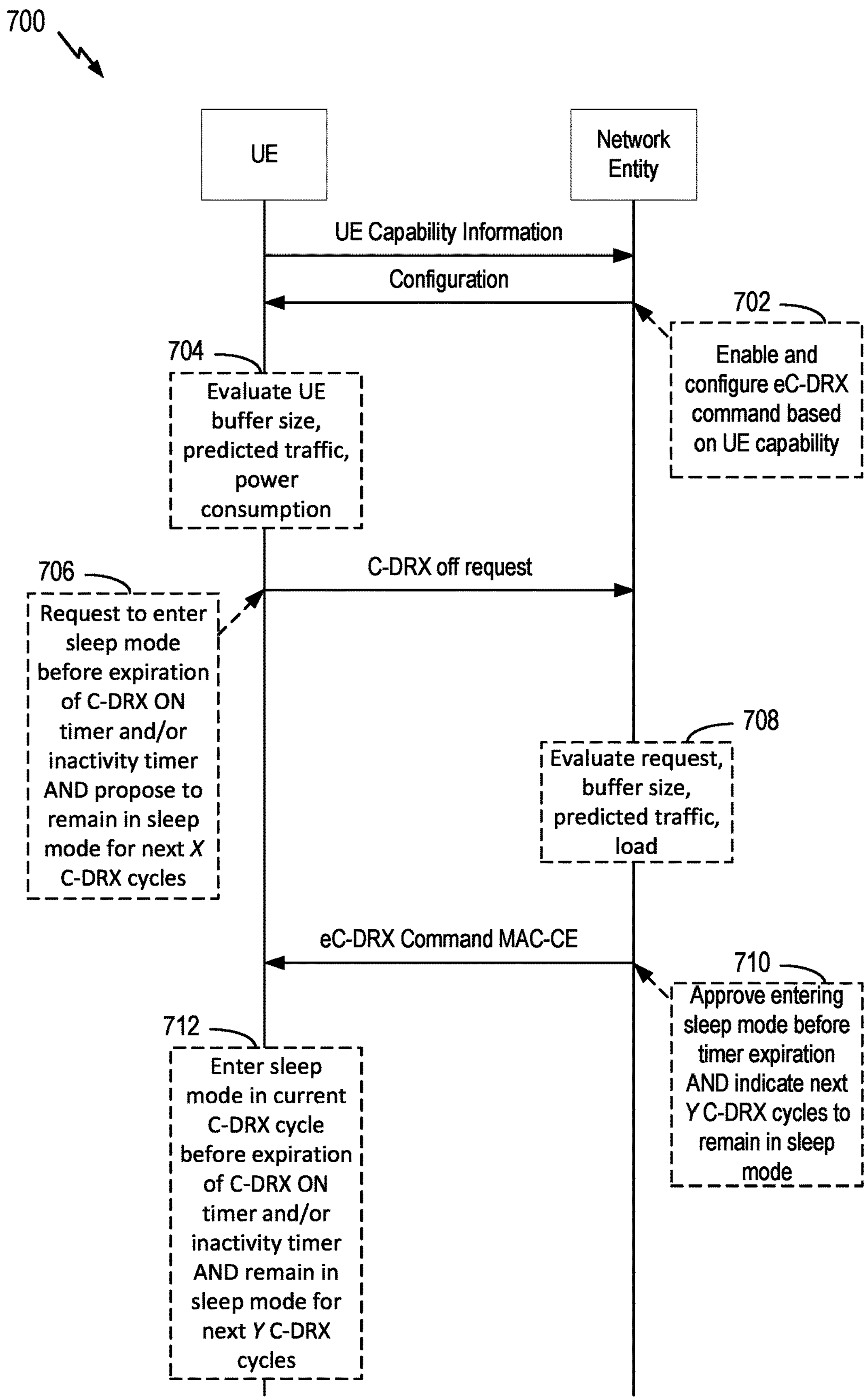
FIG. 7 depicts an example call flow diagram illustrating an example UE initiated C-DRX command, in accordance with certain aspects of the present disclosure.

FIG. 7 depicts an example call flow diagram illustrating an example scenario using enhanced C-DRX commands for early entry to a low power state in a current C-DRX cycle, as well as future C-DRX cycles.

In some aspects, the UE shown in FIG. 6 (and/or FIG. 7) may be an example of the UE 104 depicted and described with respect to FIGS. 1 and 3. In some aspects, the network entity shown in FIG. 6 (and/or FIG. 7) may be an example of the BS 102 (e.g., a gNB) depicted and described with respect to FIGS. 1 and 3 or a disaggregated base station depicted and described with respect to FIG. 2.

As illustrated at 702, the network entity may enable and configure the UE for a C-DRX mode (e.g., an enhanced C-DRX command mode). In such an enhanced C-DRX (eC-DRX) command mode, the UE may be enabled/configured to send a first message (e.g., a request/command), to the network, to request the UE enter C-DRX OFF (e.g., a low power state) early and remain in the low power state for a requested quantity of one or more future C-DRX cycles. In some cases, in response to the first message, the network may send a second message (e.g., a response/command), which may allow (e.g., with or without modification) or reject the request. For example, the network may allow the UE to enter the low power state early and/or remain in the low power state for a quantity of future C-DRX cycles (e.g., that may be the same or different than the requested quantity). In other words, the eC-DRX command mode may configure the UE to utilize eC-DRX commands. In some cases, the network may only configure the UE if it has indicated it has the capability to support such a feature.

The UE may be configured to transmit an eC-DRX request if one or more conditions are met. For example, as illustrated at 704, the UE may evaluate one or more conditions to determine if the UE would benefit from entering C-DRX off (e.g., low power state) of a current C-DRX cycle early and staying in the low power state for one or more future C-DRX cycles. For example, the UE may evaluate a UE buffer size (e.g., current and/or predicted), predicted traffic and/or power consumption.

Based on the evaluation, the UE may send an eC-DRX request to enter a low power state early in a current C-DRX cycle and one or more future C-DRX cycles. In some cases, the eC-DRX request may include an indication of a preferred number (e.g., X) of future C-DRX cycles for which the UE would like to stay in the low power state.

Figure 8A:
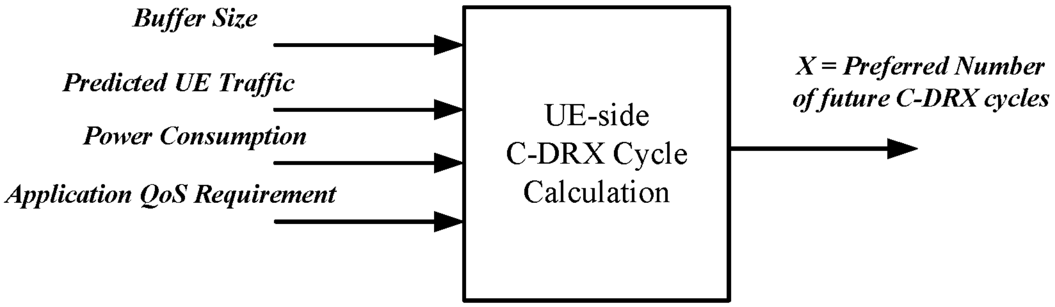
FIG. 8A and FIG. 8B depict example UE-side and network-side calculations for a preferred number of future C-DRX cycles and an approved number of future C-DRX cycles, respectively, in accordance with certain aspects of the present disclosure.

FIG. 8A depicts an example of various factors a UE may consider when calculating the preferred number X of future C-DRX cycles to indicate in the eC-DRX request. As illustrated, the UE may consider UE buffer size, predicted UE traffic (e.g., application burst prediction based on an AI/ML model), UE power consumption, and/or application quality of service (QOS) requirements.

Referring, again, to FIG. 7, as illustrated at 708, after receiving the eC-DRX request from the UE, the network entity may evaluate various factors, such as information in the request (e.g., the preferred number X of future C-DRX cycles), buffer size, predicted traffic, and network loading (e.g., based on knowledge of traffic to/from other UEs).

As illustrated at 710, based on the evaluation, the network entity may send an eC-DRX command (e.g., via a DCI or MAC CE) indicating it approves the UE entering the low power state (e.g., sleep/C-DRX off mode) before timer expiration. The eC-DRX command may also indicate the UE may remain in the low power state for an allowed number (e.g., Y) of future C-DRX cycles.

Figure 8B:
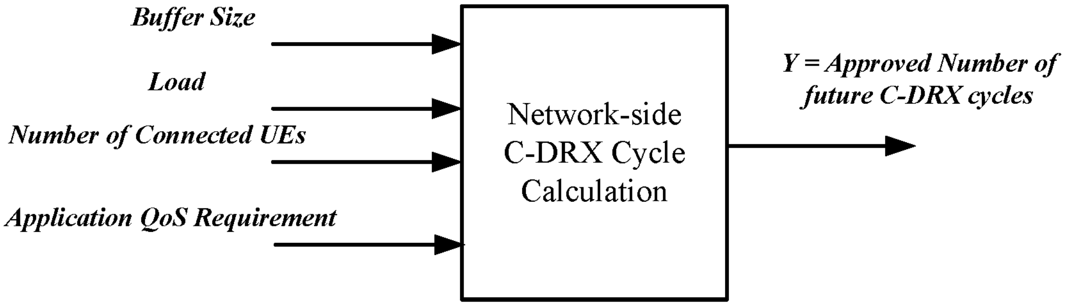

FIG. 8B depicts an example of various factors a network entity (e.g., gNB) may consider when calculating the allowed number Y of future C-DRX cycles to indicate in the eC-DRX command. As illustrated, the network entity may consider gNB buffer size, network loading (e.g., in terms of UL/DL PRB usage), a number of RRC connected UEs, and/or application QoS requirements. The network may also consider other information in the eC-DRX request, such as the number of preferred C-DRX cycles X indicated by the UE. The network entity may allow the same number of C-DRX cycles (e.g., X=Y), may allow fewer C-DRX cycles (e.g., Y<X), or may allow more C-DRX cycles (e.g., Y>X).

Referring again to FIG. 7, as illustrated at 712, after receiving the eC-DRX command, the UE may enter the sleep (e.g., C-DRX off) mode in the current C-DRX cycle before expiration of C-DRX ON timer and/or inactivity timer and also remain in sleep mode for next Y C-DRX cycles.

By allowing an enhanced C-DRX command/request to indicate the UE may stay in a low power state for a next X/Y C-DRX cycles, in addition to enabling early entry to a low power state in a current C-DRX cycle, aspects of the present disclosure may achieve increased UE energy savings as well as network energy savings (NES).

Example Operations

Figure 9:
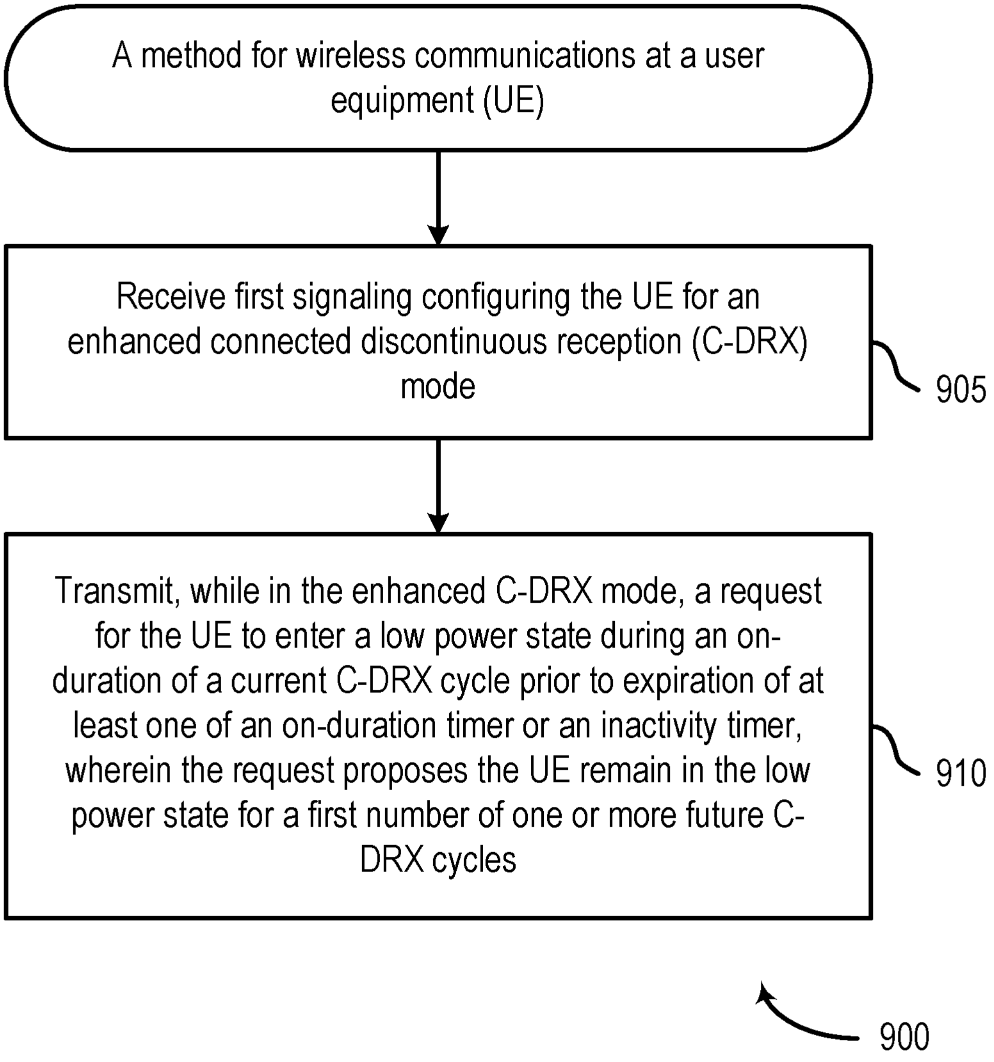
FIG. 9 depicts a method for wireless communications.

FIG. 9 shows an example of a method 900 of wireless communications at a user equipment (UE), such as a UE 104 of FIGS. 1 and 3.

Method 900 begins at step 905 with receiving first signaling configuring the UE for an enhanced connected discontinuous reception (C-DRX) mode. In some cases, the operations of this step refer to, or may be performed by, circuitry for receiving and/or code for receiving as described with reference to FIG. 11.

Method 900 then proceeds to step 910 with transmitting, while in the enhanced C-DRX mode, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles. In some cases, the operations of this step refer to, or may be performed by, circuitry for transmitting and/or code for transmitting as described with reference to FIG. 11.

In some aspects, the method 900 further includes transmitting capability information indicating capability of the UE to transmit requests to enter a low power state prior to expiration of at least one of an on duration timer or inactivity timer and capability of the UE to the low power state for the first number of one or more future C-DRX cycles. In some cases, the operations of this step refer to, or may be performed by, circuitry for transmitting and/or code for transmitting as described with reference to FIG. 11.

In some aspects, the request is transmitted based on at least one of: a buffer size associated with the UE; prediction of UE traffic; UE power consumption; or an application quality of service (QOS) requirement.

In some aspects, the method 900 further includes selecting the first number based on at least one of a buffer size associated with the UE, prediction of UE associated traffic, UE power consumption, or an application quality of service (QOS) requirement. In some cases, the operations of this step refer to, or may be performed by, circuitry for selecting and/or code for selecting as described with reference to FIG. 11.

In some aspects, the method 900 further includes receiving, after transmitting the request, an enhanced C-DRX command indicating that the UE is to enter the low power state of the current C-DRX cycle prior to expiration of at least one of an on duration timer or inactivity timer, wherein the an enhanced C-DRX command indicates the UE is to remain in the low power state for a second number of one or more future C-DRX cycles. In some cases, the operations of this step refer to, or may be performed by, circuitry for receiving and/or code for receiving as described with reference to FIG. 11.

In some aspects, the method 900 further includes entering the low power state after receiving the enhanced C-DRX command. In some cases, the operations of this step refer to, or may be performed by, circuitry for entering and/or code for entering as described with reference to FIG. 11.

In some aspects, the method 900 further includes remaining in the low power state for the second number of one or more future C-DRX cycles. In some cases, the operations of this step refer to, or may be performed by, circuitry for remaining and/or code for remaining as described with reference to FIG. 11.

In some aspects, the second number is different than the first number.

In some aspects, the enhanced C-DRX command is received via an enhanced C-DRX medium access control (MAC) control element (CE).

Figure 11:
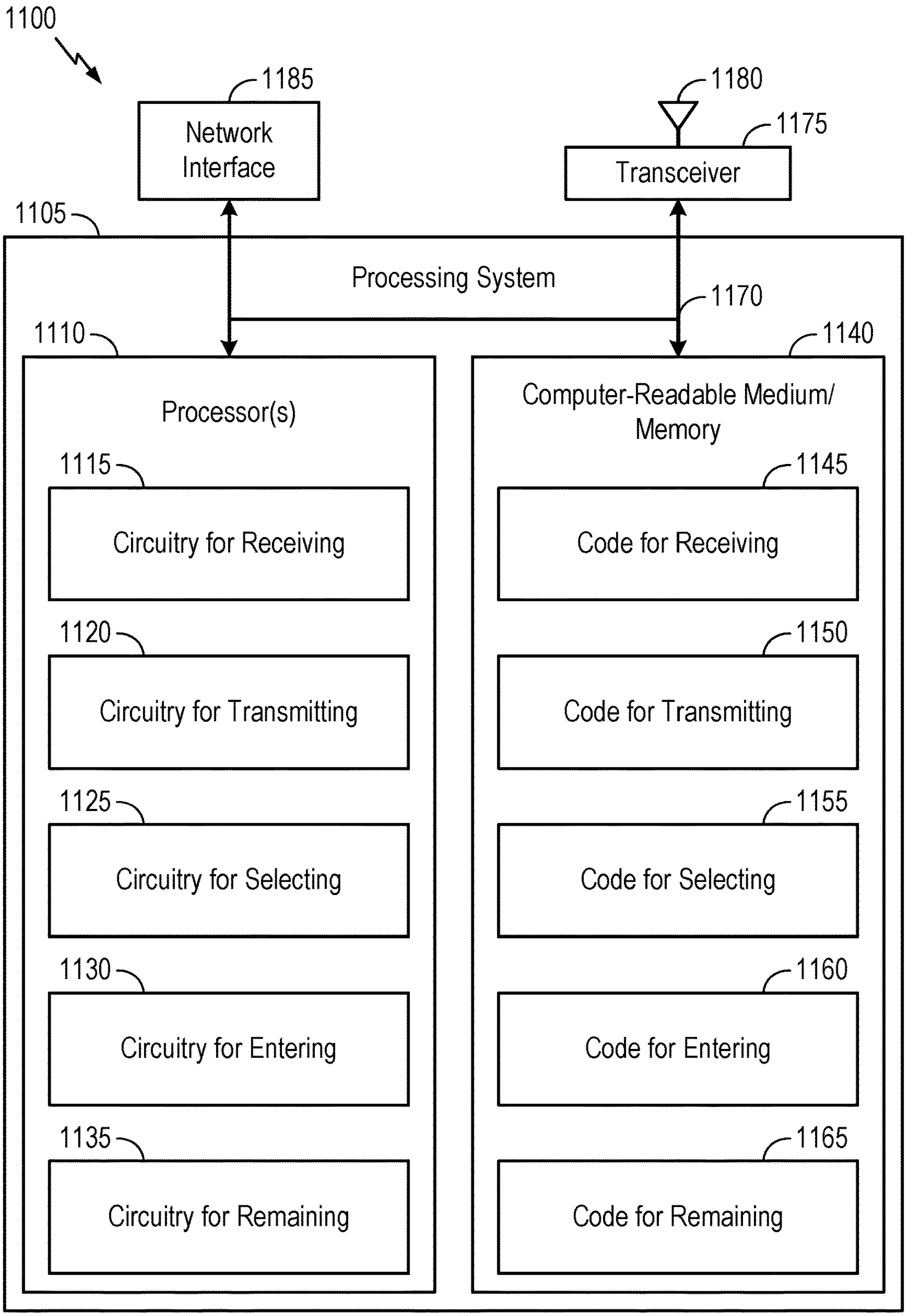
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
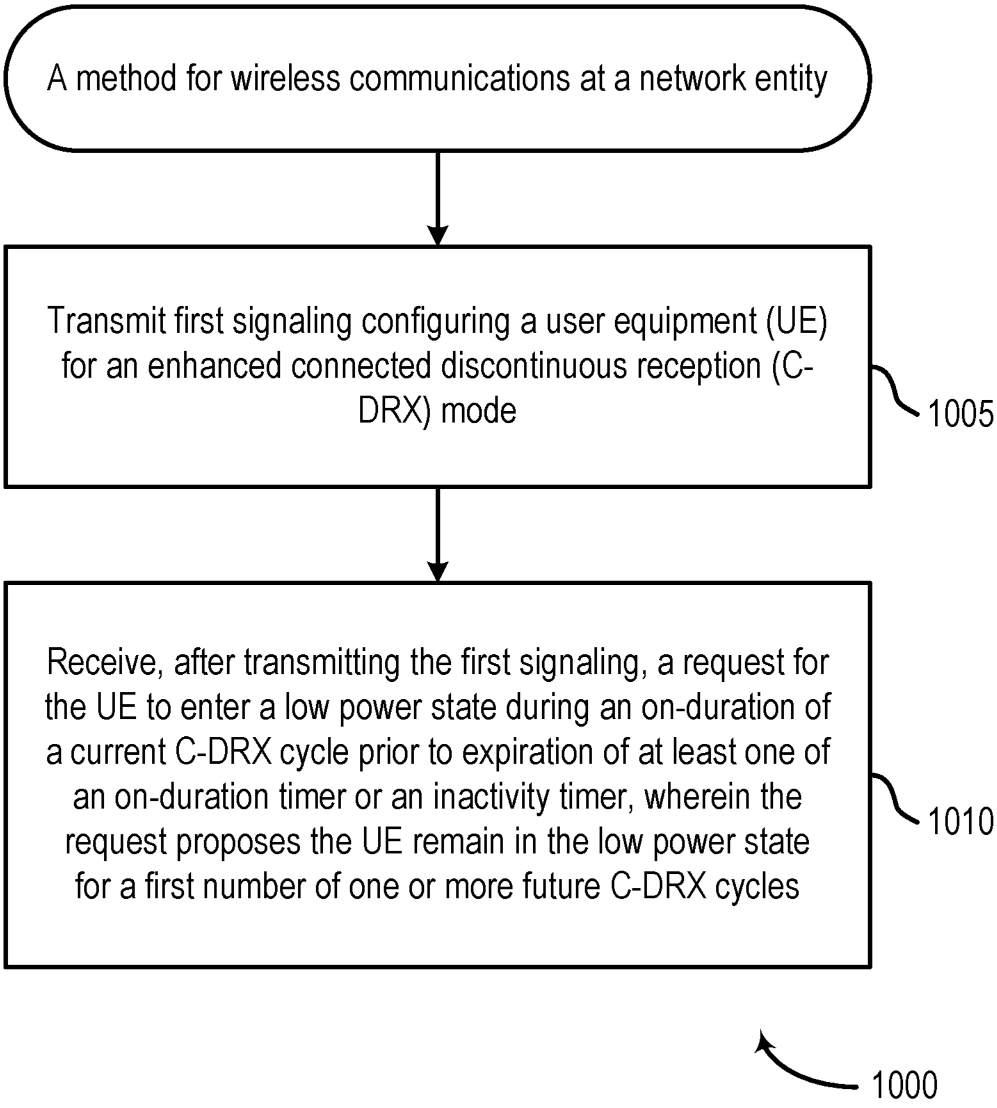
FIG. 10 depicts a method for wireless communications.

FIG. 10 shows an example of a method 1000 of wireless communications at a network entity, such as a BS 102 of FIGS. 1 and 3, or a disaggregated base station as discussed with respect to FIG. 2.

Method 1000 begins at step 1005 with transmitting first signaling configuring a user equipment (UE) for an enhanced connected discontinuous reception (C-DRX) mode. In some cases, the operations of this step refer to, or may be performed by, circuitry for transmitting and/or code for transmitting as described with reference to FIG. 11.

Method 1000 then proceeds to step 1010 with receiving, after transmitting the first signaling, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles. In some cases, the operations of this step refer to, or may be performed by, circuitry for receiving and/or code for receiving as described with reference to FIG. 11.

In some aspects, the method 1000 further includes receiving capability information indicating capability of the UE to transmit requests to enter a low power state prior to expiration of at least one of an on duration timer or inactivity timer and capability of the UE to the low power state for the first number of one or more future C-DRX cycles. In some cases, the operations of this step refer to, or may be performed by, circuitry for receiving and/or code for receiving as described with reference to FIG. 11.

In some aspects, the method 1000 further includes transmitting an enhanced C-DRX command indicating that the UE is to enter the low power state of the current C-DRX cycle prior to expiration of at least one of an on duration timer or inactivity timer, wherein the enhanced C-DRX command indicates the UE is to remain in the low power state for a second number of one or more future C-DRX cycles independent of a UE request or assistance information. In some cases, the operations of this step refer to, or may be performed by, circuitry for transmitting and/or code for transmitting as described with reference to FIG. 11.

In some aspects, the enhanced C-DRX command is transmitted based on at least one of: information contained in the request; a downlink buffer size associated with the network entity; at least one of uplink or downlink time and frequency resource usage; a number of UEs in a connected mode with the network entity; or a prediction of UE associated uplink traffic.

In some aspects, the method 1000 further includes selecting the second number based on at least one of information contained in the request, a buffer size associated with the network entity, at least one of uplink or downlink time and frequency resource usage, a number of UEs in a connected mode with the network entity, or a prediction of UE associated traffic. In some cases, the operations of this step refer to, or may be performed by, circuitry for selecting and/or code for selecting as described with reference to FIG. 11.

In some aspects, the second number is less than or equal to the first number.

In some aspects, the enhanced C-DRX command is transmitted via an enhanced medium access control (MAC) control element (CE).

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device(s)

FIG. 11 depicts aspects of an example communications device 1100. In some aspects, communications device 1100 is a user equipment, such as UE 104 described above with respect to FIGS. 1 and 3. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1175 (e.g., a transmitter and/or a receiver). In some aspects (e.g., when communications device 1100 is a network entity), processing system 1105 may be coupled to a network interface 1185 that is configured to obtain and send signals for the communications device 1100 via communication link(s), such as a backhaul link, midhaul link, and/or fronthaul link as described herein, such as with respect to FIG. 2. The transceiver 1175 is configured to transmit and receive signals for the communications device 1100 via the antenna 1180, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1140 via a bus 1170. In certain aspects, the computer-readable medium/memory 1140 is configured to store instructions (e.g., computer-executable code) that when executed by the one or more processors 1110, cause the one or more processors 1110 to perform the method 900 described with respect to FIG. 9, or any aspect related to it; and the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1140 stores code (e.g., executable instructions), such as code for receiving 1145, code for transmitting 1150, code for selecting 1155, code for entering 1160, and code for remaining 1165. Processing of the code for receiving 1145, code for transmitting 1150, code for selecting 1155, code for entering 1160, and code for remaining 1165 may cause the communications device 1100 to perform the method 900 described with respect to FIG. 9, or any aspect related to it; and the method 1000 described with respect to FIG. 10, or any aspect related to it.

The one or more processors 1110 include circuitry configured to implement (e.g., execute) the code stored in the computer-readable medium/memory 1140, including circuitry for receiving 1115, circuitry for transmitting 1120, circuitry for selecting 1125, circuitry for entering 1130, and circuitry for remaining 1135. Processing with circuitry for receiving 1115, circuitry for transmitting 1120, circuitry for selecting 1125, circuitry for entering 1130, and circuitry for remaining 1135 may cause the communications device 1100 to perform the method 900 described with respect to FIG. 9, or any aspect related to it; and the method 1000 described with respect to FIG. 10, or any aspect related to it.

Various components of the communications device 1100 may provide means for performing the method 900 described with respect to FIG. 9, or any aspect related to it; and the method 1000 described with respect to FIG. 10, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1175 and the antenna 1180 of the communications device 1100 in FIG. 11. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1175 and the antenna 1180 of the communications device 1100 in FIG. 11.

Example Clauses

Implementation examples are described in the following numbered clauses:

Clause 1: A method for wireless communications at a user equipment (UE), comprising: receiving first signaling configuring the UE for an enhanced connected discontinuous reception (C-DRX) mode; and transmitting, while in the enhanced C-DRX mode, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles.

Clause 2: The method of Clause 1, further comprising transmitting capability information indicating capability of the UE to support the enhanced C-DRX mode.

Clause 3: The method of any one of Clauses 1-2, wherein the request is transmitted based on at least one of: a buffer size associated with the UE; prediction of UE traffic; UE power consumption; or an application quality of service (QOS) requirement.

Clause 4: The method of any one of Clauses 1-3, further comprising selecting the first number based on at least one of a buffer size associated with the UE, prediction of UE associated traffic, UE power consumption, or an application quality of service (QoS) requirement.

Clause 5: The method of any one of Clauses 1-4, further comprising: receiving, after transmitting the request, an enhanced C-DRX command indicating that the UE is to enter the low power state of the current C-DRX cycle prior to expiration of at least one of an on duration timer or inactivity timer, wherein the an enhanced C-DRX command indicates the UE is to remain in the low power state for a second number of one or more future C-DRX cycles.

Clause 6: The method of Clause 5, further comprising: entering the low power state after receiving the enhanced C-DRX command; and remaining in the low power state for the second number of one or more future C-DRX cycles.

Clause 7: The method of Clause 5, wherein the second number is different than the first number.

Clause 8: The method of Clause 5, wherein the enhanced C-DRX command is received via an enhanced C-DRX medium access control (MAC) control element (CE).

Clause 9: A method for wireless communications at a network entity, comprising: transmitting first signaling configuring a user equipment (UE) for an enhanced connected discontinuous reception (C-DRX) mode; and receiving, after transmitting the first signaling, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles.

Clause 10: The method of Clause 9, further comprising receiving capability information indicating capability of the UE to support the enhanced C-DRX mode.

Clause 11: The method of any one of Clauses 9-10, further comprising: transmitting an enhanced C-DRX command indicating that the UE is to enter the low power state of the current C-DRX cycle prior to expiration of at least one of an on duration timer or inactivity timer, wherein the enhanced C-DRX command indicates the UE is to remain in the low power state for a second number of one or more future C-DRX cycles independent of a UE request or assistance information.

Clause 12: The method of Clause 11, wherein the enhanced C-DRX command is transmitted based on at least one of: information contained in the request; a downlink buffer size associated with the network entity; at least one of uplink or downlink time and frequency resource usage; a number of UEs in a connected mode with the network entity; or a prediction of UE associated uplink traffic.

Clause 13: The method of Clause 11, further comprising selecting the second number based on at least one of information contained in the request, a buffer size associated with the network entity, at least one of uplink or downlink time and frequency resource usage, a number of UEs in a connected mode with the network entity, or a prediction of UE associated traffic.

Clause 14: The method of Clause 11, wherein the second number is less than or equal to the first number.

Clause 15: The method of Clause 11, wherein the enhanced C-DRX command is transmitted via an enhanced medium access control (MAC) control element (CE).

Clause 16: An apparatus, comprising: a memory comprising executable instructions; and a processor configured to execute the executable instructions and cause the apparatus to perform a method in accordance with any one of Clauses 1-15.

Clause 17: An apparatus, comprising means for performing a method in accordance with any one of Clauses 1-15.

Clause 18: A non-transitory computer-readable medium comprising executable instructions that, when executed by a processor of an apparatus, cause the apparatus to perform a method in accordance with any one of Clauses 1-15.

Clause 19: A computer program product embodied on a computer-readable storage medium comprising code for performing a method in accordance with any one of Clauses 1-15.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term wireless node may refer to, for example, a network entity or a user equipment (UE). In this context, a network entity may be a base station (e.g., a gNB) or a module (e.g., a CU, DU, and/or RU) of a disaggregated base station.

While the present disclosure may describe certain operations as being performed by one type of wireless node, the same or similar operations may also be performed by another type of wireless node. For example, operations performed by a network entity may also (or instead) be performed by a UE. Similarly, operations performed by a UE may also (or instead) be performed by a network entity.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse direction relative to what is described (e.g., a UE could transmit a request to a network entity and the network entity transmits a response; OR a network entity could transmit the request to a UE and the UE transmits the response).

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:

at least one memory comprising computer-executable instructions; and one or more processors configured to execute the computer-executable instructions and cause the UE to:

receive first signaling configuring the UE for an enhanced connected discontinuous reception (C-DRX) mode; and transmit, while in the enhanced C-DRX mode, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles.

2. The apparatus of claim 1, wherein the request is transmitted via an enhanced C-DRX command.

3. The apparatus of claim 1, wherein the one or more processors are further configured to execute the computer-executable instructions and cause the UE to transmit capability information indicating a capability of the UE to support the enhanced C-DRX mode.

4. The apparatus of claim 1, wherein the request is transmitted based on at least one of:

a buffer size associated with the UE;

prediction of UE traffic;

UE power consumption; or an application quality of service (QOS) requirement.

5. The apparatus of claim 1, wherein the one or more processors are further configured to execute the computer-executable instructions and cause the UE to select the first number based on at least one of:

a buffer size associated with the UE;

prediction of UE associated traffic;

UE power consumption; or an application quality of service (QOS) requirement.

6. The apparatus of claim 1, wherein the one or more processors are further configured to execute the computer-executable instructions and cause the UE to receive, after transmitting the request, a response indicating that the UE is to enter the low power state of the current C-DRX cycle prior to expiration of at least one of an on duration timer or inactivity timer, wherein the an enhanced C-DRX command indicates the UE is to remain in the low power state for a second number of one or more future C-DRX cycles.

7. The apparatus of claim 6, wherein the response is received via an enhanced C-DRX command.

8. The apparatus of claim 6, wherein the one or more processors are further configured to execute the computer-executable instructions and cause the UE to:

enter the low power state after receiving the enhanced C-DRX command; and remain in the low power state for the second number of one or more future C-DRX cycles.

9. The apparatus of claim 6, wherein the second number is different than the first number.

10. The apparatus of claim 6, wherein the enhanced C-DRX command is received via an enhanced C-DRX medium access control (MAC) control element (CE).

11. An apparatus for wireless communication at a network entity, comprising:

at least one memory comprising computer-executable instructions; and one or more processors configured to execute the computer-executable instructions and cause the network entity to:

transmit first signaling configuring a user equipment (UE) for an enhanced connected discontinuous reception (C-DRX) mode; and receive, after transmitting the first signaling, a request for the UE to enter a low power state during an on-duration of a current C-DRX cycle prior to expiration of at least one of an on-duration timer or an inactivity timer, wherein the request proposes the UE remain in the low power state for a first number of one or more future C-DRX cycles.

12. The apparatus of claim 11, wherein the request is received via an enhanced C-DRX command.

13. The apparatus of claim 11, wherein the one or more processors are further configured to execute the computer-executable instructions and cause the network entity to receive capability information indicating capability of the UE to support the enhanced C-DRX mode.

14. The apparatus of claim 11, wherein the one or more processors are further configured to execute the computer-executable instructions and cause the network entity to transmit a response indicating that the UE is to enter the low power state of the current C-DRX cycle prior to expiration of at least one of an on duration timer or inactivity timer, wherein the enhanced C-DRX command indicates the UE is to remain in the low power state for a second number of one or more future C-DRX cycles independent of a UE request or assistance information.

15. The apparatus of claim 14, wherein the response is transmitted via an enhanced C-DRX command.

16. The apparatus of claim 14, wherein the response is transmitted based on at least one of:

information contained in the request;

a downlink buffer size associated with the network entity;

at least one of uplink or downlink time and frequency resource usage;

a number of UEs in a connected mode with the network entity;

a buffer status report of UE;

a power headroom report of UE;

a prediction of UE associated uplink traffic; or a QoS requirement of application traffic.

17. The apparatus of claim 14, wherein the one or more processors are further configured to execute the computer-executable instructions and cause the network entity to select the second number based on at least one of:

information contained in the request;

a buffer size associated with the network entity;

at least one of uplink or downlink time and frequency resource usage;

a number of UEs in a connected mode with the network entity;

a buffer status report of UE;

a power headroom report of UE;

a prediction of UE associated traffic; or a QoS requirement of application traffic.

18. The apparatus of claim 14, wherein the second number is less than or equal to the first number.

19. The apparatus of claim 14, wherein the enhanced C-DRX command is transmitted via an enhanced medium access control (MAC) control element (CE).

20. A method for wireless communications at a user equipment (UE), comprising:

receiving first signaling configuring the UE for an enhanced connected discontinuous reception (C-DRX) command mode; and transmitting a request for the UE to enter a low power state during a current C-DRX cycle prior to expiration of at least one of an on duration timer or inactivity timer, wherein the request proposes the UE remain in the low power state for a first number of one or more future C-DRX cycles.

21. A method for wireless communications at a network entity, comprising:

transmitting first signaling configuring a user equipment (UE) for an enhanced connected discontinuous reception (C-DRX) command mode; and receiving a request for the UE to enter a low power state during a current C-DRX cycle prior to expiration of at least one of an on duration timer or inactivity timer, wherein the request proposes the UE remain in the low power state for a first number of one or more future C-DRX cycles.

* * * * *